United States Patent [19]

Adams et al.

[11] 4,296,084

[45] Oct. 20, 1981

[54] METHOD OF AND APPARATUS FOR GAS GENERATION

[75] Inventors: Gary V. Adams, Brigham City; Fred E. Schneiter, Ogden, both of Utah

[73] Assignee: Thiokol Corporation, Newtown, Pa.

[21] Appl. No.: 88,992

[22] Filed: Oct. 29, 1979

[51] Int. Cl.³ .............................................. C01B 21/02
[52] U.S. Cl. .................................... 423/351; 422/166
[58] Field of Search .................. 280/731, 736, 741; 102/39; 422/120, 122, 123, 125, 126, 165, 166; 423/351, 410

[56] References Cited

U.S. PATENT DOCUMENTS

| | | | |
|---|---|---|---|
| Re. 30,327 | 7/1980 | Damon | 280/740 |
| 3,741,585 | 6/1973 | Hendrickson et al. | 423/410 |
| 3,785,674 | 1/1974 | Poole et al. | 422/166 |
| 3,880,447 | 4/1975 | Thorn et al. | 422/166 |
| 3,895,098 | 7/1975 | Pietz | 423/351 |
| 3,912,458 | 10/1975 | Fukima et al. | 422/164 |
| 3,947,300 | 2/1976 | Passaver et al. | 149/77 |
| 3,950,263 | 4/1976 | Fukima et al. | 55/522 |
| 3,985,076 | 10/1976 | Schneiter et al. | 422/166 |
| 3,986,456 | 10/1976 | Doin et al. | 422/166 |
| 4,116,466 | 9/1978 | Gehrig | 102/39 |
| 4,197,213 | 4/1980 | Pietz et al. | 422/165 |
| 4,203,787 | 5/1980 | Kirchoff et al. | 149/35 |

FOREIGN PATENT DOCUMENTS

2364140 7/1974 Fed. Rep. of Germany ...... 280/741
1492197 11/1977 United Kingdom .
1531955 11/1978 United Kingdom .

*Primary Examiner*—William F. Smith
*Attorney, Agent, or Firm*—Gerald K. White

[57] ABSTRACT

A solid fuel gas generator generates extremely clean odorless nitrogen gas by a combustion process that involves the burning in an annular combustion chamber having gas discharge orifices of a gas generant composition having combustion product residues including alkali metal oxides and hydroxides and which may also include iron particulates, and features the provision between the composition and the gas discharge orifices of an annular primary cooling and filtering pack in the combustion chamber for maximum retention therein of such combustion product residues, the cooling and filtering pack including a fine mesh screen surrounding the gas generant composition and one or more layers of fiberglass woven fabric around the screen, the fabric being selected for its characteristic property at the combustion chamber temperature of reacting with the caustic soda in the combustion products to form innocuous sodium silicate and of becoming tacky to enhance particle entrapment, and further features in surrounding relation to the combustion chamber an annular secondary cooling and filtering pack including an aluminum silicate blanket that reacts with caustic soda residue to form innocuous sodium silicate.

26 Claims, 2 Drawing Figures

METHOD OF AND APPARATUS FOR GAS GENERATION

BACKGROUND OF THE INVENTION

1. Field of the Invention

This invention relates to a gas generator that utilizes the combustion of a solid gas generant composition for the rapid generation of an extremely clean gas in which most of the combustion particle residue and noxious and offensive gases have been removed. The generator is particularly useful for rapidly filling vehicle inflatable cushion restraint systems for the protection of the occupants from severe impact and possible injury during a collision.

2. Description of the Prior Art

Gas generators that utilize combustible solid gas generant compositions are known in the prior art. Common features of such generators that are used for the inflation of cushion restraint systems are the inclusion in a housing of a gas generant composition containing a pelletized alkali metal azide and means to filter and to cool the gas positioned between the composition and gas discharge orifices, as defined by the housing. Such compositions are considered advantageous for use in such applications because the product of combustion is mainly nitrogen, an inert gas, and the speed of reaction or burning thereof, upon ignition, may be selected to be such as to effect the generation of gas at a very rapid rate but without detonation. Such constituents that burn rapidly, however, usually burn with a temperature of about 1000° C., and develop a pressure in the housing in excess of 2000 psia. Further, the gas that is generated contains combustion residue including molten particles of metal and/or reactant oxides and also noxious and offensive gases. The high pressure that builds up in the housing tends to produce an explosive discharge of residue from the housing.

Accordingly, among the problems associated with such prior art gas generators has been the containment of the high pressure reaction within a housing of acceptable weight and bulk, and adequate filtering and cooling of the generated gas. Various chemical and mechanical cooling means that have been provided have been found to be either unreliable after extended periods, unacceptably bulky, and/or incapable of reducing the generated gas temperature to a desirably low level. The filtering means that have been provided have also been incapable of reducing the combustion residue entrained in the gas to a desirably low level. In each case the result is discomfort to the vehicle occupants who have been spared severe impact during a collision.

A proposal made in the prior art for reducing the temperature of the generated gas, as disclosed in U.S. Pat. No. 3,985,076, granted Oct. 12, 1976, is to promote both the cooling and speed of the reaction by a mechanical arrangement of a pelletized gas generant composition, ignition means therefor, and means for filtering and the cooling, thereby allowing the use of a cooler burning gas generant. That is to say, the gas generant composition is disposed to surround the ignition means so that a greater proportion of the gas generant material is directly exposed to the hot gases and flame therefrom. Cooling and the speed of reaction are enhanced by the fact that the gases generated expand rapidly in all directions rather than linearly, as in a cylindrical arrangement. While an improvement in these respects, there still exists a need for further improvements in respect of providing a gas that is generated at even lower temperatures and lower pressures, also, and with less entrained combustible residue and noxious and offensive gases.

Gas generating compositions have been proposed that comprise mixtures of metal azides, oxidant metal compounds and silicon dioxide. The stated purpose of the silicon dioxide is to react with and thereby transform the toxic solid combustion residue to a non-toxic or physiologically harmless residue, specifically a glass-like alkali silicate. Known U.S. patents that disclose such compositions are U.S. Pat. No. 3,883,373, granted May 13, 1975, No. 3,912,561, granted Oct. 14, 1975, No. 3,947,300, granted Mar. 30, 1976, and No. 4,021,275, granted May 3, 1977. Such compositions leave something to be desired because of difficulty in uniformly mixing silicon dioxide with the metal azide and oxidant compound as required to react the silicon dioxide with the residues and for obtaining satisfactory combustibility.

Mechanical filtering systems are also known that include filter packs in the gas-flow path, such filter packs including multiple layers of screen of various mesh sizes, some made of metal and including one or more layers of high temperature glass fibers in which the filtering action is determined solely by the mesh sizes of the various filter layers. U.S. patents disclosing such filter packs are U.S. Pat. No. 4,017,100, granted Apr. 12, 1977, and No. 4,012,211 granted Mar. 15, 1977.

There is also described in the prior art gas generant compositions that are said to burn with the production of only the desired gaseous product and a solid product in the form of a sinter or clinker that does not escape from the generator housing. Such compositions are described in U.S. Pat. No. 3,895,098, granted July 15, 1975, No. 3,931,040, granted Jan. 6, 1976, No. 3,996,079, granted Dec. 7, 1976 and No. 4,062,708, granted December 13, 1977. They are described as comprising mixtures of metal oxides such as nickel oxide or iron oxide, and an alkali metal azide. A primary particle size for the reactant oxide in the range of a small fraction of a micron to a few microns is indicated as essential for effecting a burning rate fast enough for inflating an inflatable occupant restraint system.

Efforts to make an operative gas generator utilizing a gas generant composition as described in the aforementioned patents have been unsuccessful. Among the problems encountered were difficulty in compacting the mixture to form a stable pellet, and difficulty in igniting the mixture.

Pelletizing the gas generating composition has been found to be essential for the composition to remain reliable over extended periods, and for providing a uniform surface area for uniform burning upon ignition of the composition. Otherwise the burning rate is not predictable. Without pelletizing there is a tendency for packing and separation of the finely divided particles after the gas generator has been subjected to vibration over an extended period of time, as occurs during ordinary use, particularly when applied to a vehicle.

In copending application of Fred E. Schneiter and George F. Kirchoff, Jr. bearing Ser. No. 970,602, filed Dec. 18, 1978, and issued on May 20, 1980 as U.S. Pat. No. 4,203,787, there is described a gas generant composition consisting of a mixture of 60–80% of sodium azide ($NaN_3$) 2–26% or iron oxide ($Fe_2O_3$), 0–6% of sulfur ($S_2$) and 2–26% of molybdenum disulfide ($MoS_2$), a preferred mixture comprising 66% sodium azide, 30% iron oxide, 2% sulfur and 2% molybdenum disulfide. It has been found that this mixture is readily compacted to form a stable pellet and provides a burning rate at a combustion temperature of 1025° C., that is fast enough to effect inflation of a vehicle cushion restraint system within 45 to 60 milliseconds. Important features of the combustible composition are its substantially lower operative burning temperature at a high burning rate and at a substantially lower pressure, providing a gas, as generated, that is cooler by at least 200° C. than that available from prior art generators. The sodium azide produces a high percentage of nitrogen generating efficiency. The molybdenum disulfide and sulfur provide excellent combustion stability. The iron oxide is reduced during combustion, and the iron, Fe, that is thereby produced, forms a shower of molten particulate. This particulate tends to be blown out of the combustion chamber, being carried along with the generated gas. There remains, additionally, combustible residue in the form of offensive gases that also tend to be carried out of the generator with the generated gas.

Thus, there still exists a need for further improvements in solid fuel gas generators, particularly in respect of the filter structure and its cooperative relation with the gas generant composition and the combustion chamber, at the high temperature environment therein, for enabling the trapping within the combustion chamber of larger amounts of the particulate matter and for rendering innocuous the noxious and offensive gases that are produced, thereby to make the gas generator more attractive to both the user and the manufacturer, to the user from the standpoint of comfort as well as safety, and to the manufacturer from the standpoint of simplifying and reducing the weight and size of the structure, and hence, reducing the manufacturing cost, and further, enhancing reliability.

SUMMARY OF THE INVENTION

Among the objects of the invention is to provide a method of and apparatus for producing an extremely clean odorless inert gas.

Another object of the invention is to provide for use in a solid fuel gas generator an improved method of and apparatus for filtering combustion particulate residues and gases.

Another object of the invention is to provide an improved filter structure for use in a solid fuel gas generator.

A further object of the invention is to provide an improved solid fuel gas generator that produces a gas having a pH of 7 to 8 without the use of a chemical neutralizer.

Still another object of the invention is to provide an improved solid fuel gas generator in which the combustion chamber operating pressure is under 1500 psi thereby allowing the use of light weight components for the housing and combustion chamber structure.

Another object of the invention is to provide such a generator that functions with good ballistic performance.

In accomplishing the foregoing objects and other objectives of the invention, there is provided a gas generator that is generally similar in its mechanical arrangement to the generator disclosed in the aforementioned U.S. Pat. No. 3,985,076. The generator of the present invention, however, features improvements in respect of simplifying the generator, in the ignition and gas generant compositions employed, in the construction and arrangement of the primary or combustion chamber filter, and of the secondary or fine particulate final chamber filter. In an operative embodiment of the invention, the improved primary and secondary filters provide a capability of filtering out 99.6% of the particulate solids from the generator effluent, such filtering occurring during a 45 millisecond function time with an operating pressure in the combustion chamber in the 1500 psi-2000 psi range.

Specifically, in accordance with one aspect of the invention, the primary or combustion chamber filter includes one or more layers of a woven fabric or cloth that is selected for its compatibility with the combustion chamber temperature during burning of the gas generant composition to the end that the fabric, at that temperature, provides a tacky surface that facilitates the entrapment of particulate solid residues but does not melt or erode away under the effects of the high temperature environment. The effectiveness of the filter is enhanced by its immediate proximity to the gas generant composition, in close surrounding relation thereto. Thus the filter is in a position to be effective while the acceleration and velocity of the generated gases are still at a relatively low level. It is believed that as a result of the formation of the tacky surface, the porosity of the woven fabric is reduced for a short interval of one or two milliseconds of the function time at an early stage of the function time. During this short interval solid particulate combustion residue is prevented from being blown out of the combustion chamber thus allowing the solid particulate residue to condense and become trapped in the filter.

In one specific form of the invention the combustion chamber filter includes one to three layers of coarse screen immediately adjacent the combustion chamber wall. Inboard of the coarse screen are one or more layers of the fiberglass woven fabric or cloth. Multiple layers of fine mesh screen, preferably of carbon steel, are provided inboard of the multiple layers of fiberglass cloth for providing a relatively large cool surface for the condensation of particulate combustion residue prior to encountering the multiple layers of fiberglass fabric. An added benefit of the use of the fiberglass woven fabric in the primary filter is that under the high temperature environment, the glass reacts with caustic sodium oxide, $Na_2O$, an effluent of the combustion process, to form innocuous sodium silicate.

The secondary or fine particulate final filter is located outside the combustion chamber, in a diffuser space of the gas generator. This filter is comprised of multiple wraps of wire mesh which serves to cool the gas and also to provide a surface for condensation of solid particles. Surrounding the wire mesh are one or more wraps of an aluminum silicate blanket. This blanket serves as a particle trap for solid particulate combustion residue that still is entrained in the gas stream, and also reacts with particles of sodium oxide which come into intimate contact with the secondary filter to form sodium silicate.

DESCRIPTION OF THE PREFERRED EMBODIMENTS

Figure 1:
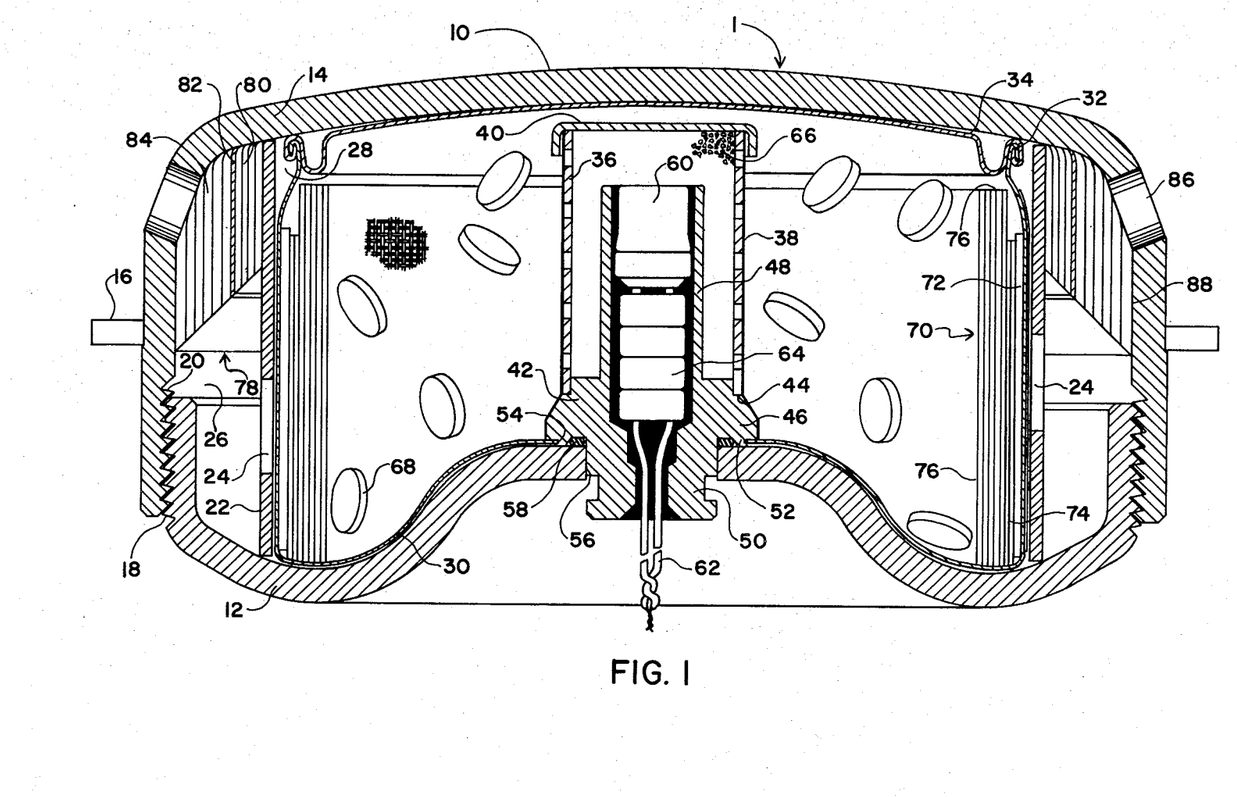
FIG. 1 of the drawing is a sectional view of a gas generator having particular utility in a vehicle cushion restraint system for protecting the driver of the vehicle.

As shown in FIG. 1 of the drawings, the gas generator 1 includes a diffuser housing 10 comprising a lower concave half shell or base 12 and an upper convex half shell or cover 14 having an annular mounting flange 16 suitably welded thereto for mounting the generator 1, typically, centrally of the steering wheel of a vehicle. The half shells 12 and 14 have internal screw threads 18 and 20 for engagement of and locking of the half shells together. Enclosed within the half shells 12 and 14 are a cylindrical member 22 having a plurality of circumferentially spaced ports or orifices 24. The opposite ends of member 22 engage the respective concave and convex surfaces of the half shells in sealing relation to form an outer annular chamber 26 and an inner cylindrical chamber 28. A rupturable hermetically sealed cylindrical cartridge or container 30 is positioned in chamber 28, being disposed coaxially therewith and held firmly in position. The lower and upper surfaces of cartridge 30 conform to the lower and upper inner surfaces of half shells 12 and 14, respectively.

The cylindrical side wall of cartridge 30 engages the inner surface of cylindrical member 22, completely around its periphery. The upper end of cartridge 30 comprises an end disc 34 that is sealed by a sealant 32 to the cylindrical side wall with a double-crimp seal and suitable sealant, typically as provided in metal containers used for preserving food and beverages.

Positioned in cartridge 30 in coaxial relationship therewith is a perforated cylindrical initiator tube 36 having a rupturable metal foil or diaphragm 38 sealed to the outer wall thereof. A closure cap 40 is provided for the tube 36 at the upper end. Tube 36 is supported at the lower end thereof on a shoulder 44 of a generally cylindrical hollow initiator mounting adapter 42 having a flange 46, a thin upper tubular initiator barrier portion 48, and a thick lower tubular portion 50, said tubular portions 48 and 50 being concentrically arranged with respect to tube 36. A ring-like projection 52 on the lower side of flange 46 extends through and is retained by a circular opening 54 that is provided in the bottom of cartridge 30. The tubular portion 50 of adapter 40 also extends through and is retained in a circular opening 56 that is provided in the bottom of the half shell 12. Desirably, tubular portion 50 is press fit in opening 56.

A sealing O-ring 58 is provided between the flange 46 and the half shell 12.

A conventional electric squib 60 having a pair of energizing lead wires or terminals 62 is positioned in the upper portion 48 of adapter 42, with lead wires extending through ferrite beads indicated at 64. The ferrite beads are provided to render the squib 60 substantially insensitive to extraneous radio frequency energy that may pervade the environment surrounding the gas generator. Desirably, in order to render the electric squib additionally insensitive to extraneous radio frequency energy and electrostatic potentials, an arrangement may be utilized as disclosed in application Ser. No. 109,730, filed Jan. 4, 1980, which is a continuation-in-part of application Ser. No. 909,143, filed June 15, 1978, which in turn, is a continuation-in-part of application Ser. No. 892,725, filed Apr. 3, 1978.

As shown in the drawing, the tubular portion 48 and the electric squib 60 are centrally located in perforated tube 36 and are surrounded therein by pyrotechnic material comprising igniter granules 66. Although various pyrotechnic materials may be employed, a preferred material is a granular mixture of 15% by weight of boron and 85% of potassium nitrate plus or minus 10% of lead azide. This mixture, as described in the above mentioned copending application Ser. No. 970,602, now U.S. Pat. No. 4,203,787 has been found to burn with a very hot flame.

As noted, the rupturable metal foil 38 surrounds the perforated tube 36. The metal foil 38 and tube 36 are surrounded by uniformly distributed pellets 68 of a gas generant composition. Pellets 68 in turn, are surrounded by an annular primary or combustion chamber filter indicated at 70. The metal foil 38 serves the dual purpose of retaining the granular pyrotechnic material 66 in the perforated tube 36 and of insuring that the high temperature gases produced by the pyrotechnic material 66, upon firing of the squib 60, have sufficient pressure to permeate the gas generant composition 68 thoroughly for efficient and sustained ignition before they are released by rupture of the metal foil 38.

Although in the broader aspects of the present invention, the gas generant composition may be any one of a number of compositions meeting the requirements for burning rate, nontoxicity, and flame temperature, a preferred material is that described in the aforementioned copending application Ser. No. 970,602, now U.S. Pat. No. 4,203,787 of Fred E. Schneiter and George F. Kirchoff. Also preferred are the azide, sulfur, molybdenum sulfide gas generant compositions described in U.S. Pat. No. 3,741,585. Of these latter compositions, particularly preferred are compositions comprising from about 65 weight percent to about 70 weight percent alkali metal azide, up to about 4 weight percent sulfur and from about 27 weight percent and about 33 weight percent molybdenum disulfide, especially a composition comprising about 68 weight percent sodium azide, about 2 weight percent sulfur and about 30 weight percent molybdenum disulfide.

The combustion chamber filter 70 is preferably made in three parts, specifically one to three layers of coarse screen 72 adjacent to the inner or chamber wall of cartridge 30, one or more layers of filter cloth 74, specifically of fiberglass woven fabric or cloth, and multiple layers of fine mesh screen 76.

A secondary filter 78 is located outside of the inner or combustion chamber 28, in the diffuser area. Filter 78 is a screen pack comprised of three parts, specifically, multiple wraps of coarse wire mesh 80, one or more wraps of aluminum silicate blanket 82 that surround the wire mesh 80, and several wraps of fine mesh screen 84, preferably 100×100 mesh, adjacent to the inner wall of the upper half shell 14 and that surround and provide structural support for the aluminum silicate blanket 82 and also cover exit ports or orifices 86 that are circumferentially disposed in the upper portion of the sidewall of the half shell 14. Orifices 86 desirably are angularly offset from the orifices 24 in the cylindrical member 22 and provide exit openings for the gas that is generated by the generator 1 upon combustion of the gas generant composition 68.

The screen pack comprising filter 78 is formed around the cylindrical member 22, a suitable seal strip 88 being placed around the outer wraps of fine mesh screen 84 for contacting the inner surface of the upper half shell 14 when the latter is brought into cooperative locking engagement with the lower half shell 12. The arrangement is such that the screen pack 78 is then brought under a suitable compressive load, with the upper edges curved inwardly, in the annular space between the ports 24 in the cylindrical member 22 and the exit ports 86 in the upper half shell 14.

By way of illustration and not limitation it is noted that in an operative embodiment of FIG. 1 of the invention, the external diameter of the generator 10 is 10.998 cm. (4.330″) and its height is 6.353 cm. (2.501″), and the materials of which several components are made and the dimensions thereof where relevant are as indicated below:

| Components | Materials | Dimensions |
| --- | --- | --- |
| half shell 12 | carbon steel | |
| half shell 14 | carbon steel | |
| cartridge 30 | aluminum | |
| primary filter coarse screen | carbon steel | 18 × 18 mesh |
| filter cloth 74 | fiberglass, Style 1528 mfd. by Hexcel Trevarno, Dublin, California | 42 × 32 plain mesh |
| fine mesh screen 74 | carbon steel | 40 × 40 mesh |
| secondary filter coarse screen 80 | | 0.635 cm. (.25″) thick |
| blanket 82 | A binder of content of 5% and a chemical analysis of fibers of 46% by weight, binder free and 54% of Alumina (Al$_2$O$_3$) silica (SiO$_2$) crabfiber paper, Johns-Manville, Denver, Colo. | |
| fine mesh screen 84 | | 100 × 100 mesh |

Figure 2:
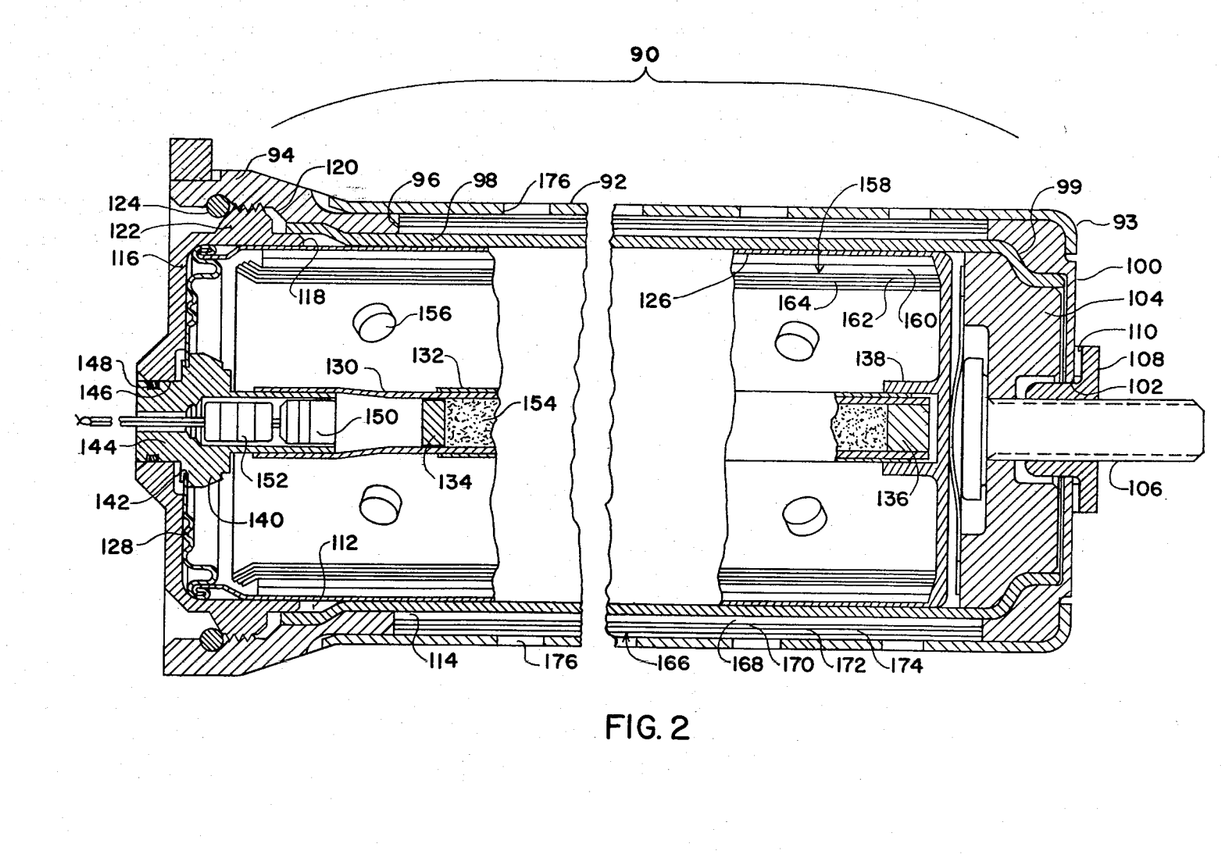
FIG. 2 is a sectional view of a gas generator having particular utility in a vehicle cushion restraint system for protecting the passengers in the vehicle.

FIG. 2 is a sectional view of a gas generator 90 according to the present invention that is particularly applicable for use in a vehicle cushion restraint system for protecting the passengers, being mounted in an appropriate manner in or on the dash board of the vehicle.

As shown, the generator 90, similarly to the generator 1 of FIG. 1, is annular in general construction, and essentially differs in principle and operation from the generator 1 only in being elongated, typically having a length of 52.54 cm. (21″) and having the capability of a greater output of generated gas. Thus, the generator 90 includes an elongated cylindrical housing 92 preferably made of carbon steel that for most of its length has thin walls but at the left end, as seen in FIG. 2, includes a heavier diffuser flange section 94 that provides a shoulder indicated at 96. Section 94 flares outwardly to receive a second elongated thin cylindrical member 98 made of carbon steel that is concentrically positioned with respect to housing 92. The wall of the right end of cylindrical housing 92 is rolled inwardly as indicated at 93 and is provided with a stud end flange 100 having a centrally disposed opening 102 therein. The right end of cylindrical member 98 is provided with an inward S-shaped curl as indicated at 99. Cooperating with the right ends of housing 92 and cylindrical member 98 for firmly locking those ends together are a stud end cap 104, a weld screw 106, a nut 108 and a lockwasher 110. The stud end cap 104 fits within the right end of cylindrical member 98 and has a peripheral surface that matches the S-shaped curl 100 in the end of member 98. Weld screw 106 extends through stud end cap 104 and outwardly of the stud end flange 100 to engage the nut 108 which extends partially through stud end cap 104, the lockwasher 110 being provided to firmly retain the members together for long periods notwithstanding the presence of vibration. When the weld screw 106 and nut 108 are pulled together in locking relationship, the right end of cylindrical member 98 is brought into tight engagement with the inner wall of stud end flange 100.

It will be noted that the interior of the cylindrical member 98 forms a combustion chamber 112 and that the annular space 114 between the member 98 and the inner surface of housing 92 provides a diffuser space that extends to the left, however, only as far as the inner shoulder 98 on housing 92.

The left ends of the housing 92 and cylindrical member 98 are closed by a ring-shaped closure member 116 that has a first peripheral portion 118 that fits inside a flared left end 120 of cylindrical member 98, and a second peripheral externally threaded portion 122 that fits inside the flared internally threaded section 94 of housing 92, in threaded engagement therewith retaining and sealing O-ring 124 may also be provided, as shown.

An elongated rupturable hermetically sealed cylindrical cartridge 126, preferably made of aluminum, is positioned in chamber 112, being disposed coaxially therewith, completely filling the chamber and being held firmly against either radial or lengthwise movement. The left end of cartridge 126 comprises and end disc 128 that is sealed by a suitable sealant to the cylindrical sidewall with a double crimp seal.

Positioned in cartridge 126 in coaxial relationship therewith is an elongated perforated cylindrical initiator or igniter tube 130 having a rupturable metal foil or igniter barrier 132 sealed to the outer wall thereof. An igniter plug 134 is provided adjacent the left end of igniter tube 130 and a separate igniter plug 136 is provided at the right end of tube 130, adjacent the right end wall of cartridge 126. As shown, the inner right end wall of cartridge 126 includes an inwardly projecting short cylindrical portion 138 for retaining the right end of igniter tube 130 in position. The left end of igniter tube is supported on the end of an initiator mounting member 140 that, in turn, is retained by a circular opening 142 in the cartridge 126 and includes a portion 144 that is press fit in a central opening 146 provided in ring shaped closure member 116. An O-ring 148 is provided to retain mounting member 140 in position.

A conventional electric squib 150 having suitable energizing terminals is provided in the right end portion of initiator mounting member 140, ferrite beads 152 being provided to render the squib 150 insensitive to extraneous radio frequency energy. Between the igniter plugs 134 and 136 in the igniter tube 130 is pyrotechnic material comprising igniter granules 154. Surrounding the igniter tube 130 are uniformly distributed pellets 156 of gas generant composition, which composition, in turn, is surrounded by an elongated annular primary or combustion chamber filter 158 which, generally, is similar to the filter 70 of the FIG. 1 gas generator.

The primary filter 158 comprises a filter pack of three screens including one to three layers of coarse screen 160 that are adjacent the inner wall of cartridge 126, one or more layers of fiberglass woven fabric or cloth 162, and multiple layers of fine mesh screen 164, preferably 40×40 mesh carbon steel.

A secondary filter 166 which, generally, is similar to the filter 78 of FIG. 1, is located in the annular chamber 114 comprising the diffuser region and comprises a coarse, 18 mesh, stand-off screen 168 that surrounds the cartridge 126 in contact therewith, multiple wraps of course screen 170, one or more wraps of aluminum silicate blanket 172 that surround the coarse screen 170, and several wraps of fine 100 mesh screen 174 that are provided adjacent the inner wall of housing 92. The 18 mesh standoff screen 168 is provided to allow the aluminum foil of cartridge 126 to blow out of the way.

The secondary filter 166 is arranged to cover a plurality of exit ports or orifices 176 that are provided in the cylindrical housing 92 and a plurality of exit ports or orifices (not shown) that are provided in the housing 98. Preferably, four angularly spaced rows of exit ports are provided circumferentially of each of members 92 and 98, with 12 ports in each row, the exit ports in member 98 being offset both linearly and radially from the exit ports 176 in housing 92.

OPERATION OF THE PREFERRED EMBODIMENTS

The mechanical arrangement of the gas generator component of the present invention inherently promotes speed of reaction, cooling and filtering. Accordingly, with the structures of each of FIGS. 1 and 2 a slower burning, and hence, cooler burning gas generant may be used. The speed of reaction is increased notwithstanding the inherent characteristic of slower burning gas generants to be hard to ignite. This is the result of several factors including the use of a composition for the igniter granules, in the combustion initiator that provides a higher flame temperature than in the prior art generators, and by arranging the gas generant composition pellets in uniformly distributed annular surrounding contact with the initiator whereby the entire peripheral area of the gas generant composition is immediately and simultaneously exposed to the hot gases and high temperature flame from the initiator.

The speed of reaction in the generation of the desired gas, that desired for inflation of a vehicle cushion restraint, for example, is enhanced because the burning gases from the initiator and from the gas generant composition are made to expand rapidly in all directions, without detonating, however, thus permeating and diffusing rapidly throughout the gas generant composition. Featured, also, are the arrangement and construction of the primary or combustion chamber filter and the secondary or fine particulate final filter that have the capability of filtering out 99.6% of the solids from the gas generator effluent during a 45 millisecond function time with a low operating pressure of less than 1500 psi. The porosity of the fiberglass woven fabric or cloth of the primary or combustion chamber filter is so low in this pressure range as to retain the products of combustion or particulate residues in the combustion chamber for a short interval, an interval of one or two milliseconds only in the 45-60 millisecond function time of the generator. This prevents most of such combustion products or particulate residues from being explosively blown out of the combustion chamber and allows them to be cooled and condensed on the carbon steel fine mesh screen that is located inboard of the fiberglass woven fabric element of the filter.

Specifically, the pyrotechnic material of the initiator, the gas generant composition and the primary filter are all contained in the hermetically sealed aluminum cartridge. This insures reliability of the generator over long periods. The aluminum cartridge is positioned in the combustion chamber of the generator. Upon initiation of combustion by the firing of the squib, the rising gas pressure ruptures the sidewall areas of the cartridge adjacent the orifices of the combustion chamber. This allows gas to flow through the primary filter and out of the combustion chamber through the several orifices.

The combustion chamber filter in each of FIGS. 1 and 2, consists of one to three layers of a coarse screen adjacent to the wall of the chamber. This serves as a collecting area for gas to flow along the chamber wall to the chamber orifices and permits gas to flow through the primary filter and out of the combustion chamber through the several orifices. The combustion chamber filter in each of FIGS. 1 and 2, consists of one to three layers of a coarse screen adjacent to the wall of the chamber. This serves as a collecting area for gas to flow along the chamber wall to the chamber orifices and permits gas to flow evenly through the primary filter regardless of the proximity of a combustion chamber orifices. Inboard of the coarse screen are one or more layers of the fiberglass woven fabric. The fiberglass fabric is selected for compatability with the temperature in the combustion chamber during burning of the selected gas generant composition thereby to provide a tacky surface for particle entrapment that does not melt or erode away under the effects of the high temperature gas. An effect accompanying the production of the tacky surface appears to be a swelling of the fibers of the fiberglass fabric that reduces the porosity of the primary filter, and hence, causes the primary filter to restrict the flow of gas and combustion residue out of the combustion chamber. This effect continues for only a short interval, as described, but long enough to allow cooling and condensation of hot and molten particulate residue within the voids of the filter. Inside the multiple layers of the fiberglass cloth are multiple layers of fine mesh carbon steel screen. The layers of the fine mesh carbon steel provide a large relatively cool surface for condensation of combustion solids prior to encountering the multiple layers of fiberglass woven fabric. Approximately 95 percent of all solid products of combustion are trapped in the combustion chamber filter. It is noted that outside of the combustion chamber the acceleration of the gases that are generated becomes so high that trapping of the products of combustion in that region becomes exceedingly difficult.

An added benefit of the fiberglass cloth is that under the high temperature environment, the glass reacts with caustic sodium oxide, $Na_2O$, an effluent of the combustion process, to form innocuous sodium silicate.

The secondary filter in each of FIGS. 1 and 2, is located outside of the combustion chamber in the diffuser area of the annular chamber 26. This filter is comprised of multiple wraps of wire mesh which serves to cool the gas and provide surface for condensation of solid particles. Surrounding the wire mesh filter pack are one or more wraps of the aluminum silicate blanket. The aluminum silicate blanket serves two distinct functions. One of these functions is to react with particles of sodium oxide which come into intimate contact with the second filter to form sodium silicate.

Surrounding the aluminum silicate blanket are several wraps of fine mesh screen which provide structural support for the aluminum silicate blanket. It is noted that aluminum silicate blanket is porous, has very little strength, and tends to disintegrate under the effects of the high velocity gas stream. The filter elements, however, retain the solids entrapped. The fine mesh outer screen is used to trap these aluminum silicate filter particles and prevent them from being carried out of the exit orifices of the housing with the clean combustion gases.

The present invention is not dependent upon the specific chemical composition of the combustible gas generant, the selection of the fiberglass woven fabric or cloth for compatibility with the combustion temperature of the selected gas generant composition being the prime requirement. The use of the disclosed primary filter within the combustion chamber provided by the cartridge in a gas generator utilizing a gas generating composition as disclosed in the aforementioned copending application provides distinct advantages. These advantages are derived from the lower temperature and pressure at which combustion of that composition takes place in the combustion chamber. This makes possible a gas generator of lighter weight since the structural components are subjected to lower combustion chamber temperature and pressure, and the production of an extremely clean gas and odor free gas. In the aforementioned operative embodiment of this form of the invention, the amount of solid or particulate matter in the effluent gas was reduced from 3 to 5 grams, as obtained in the prior art generator of U.S. Pat. No. 2,985,076, to 250 milligrams. Moreover, the generator of the invention produced a substantially chemically neutral gas with a pH of 7 to 8 without the use of a chemical neutralizer.

Thus, there has been provided, according to the invention, an improvement in the generation of gas by a solid fuel generator that results in the generation of extremely clean odorless gas having a substantially reduced temperature. Such gas generation is accomplished by a generator of smaller size, having lighter weight components, that operates at a pressure under 1500 psi. The improved generator includes a gas generant composition characterized by sustained combustion at a lower temperature of about 1025° C. but nevertheless at a burning rate high enough to inflate a vehicle cushion restraint system within 45 milliseconds. The pyrotechnic material for initiating combustion provides a desirably strong burning initiative thereby rapidly to effect sustained vigorous combustion of the gas generant composition. A combustion chamber cooling filter for maximum solids retention with low pressure drop, that is, the primary filter, includes a fiberglass woven fabric or cloth that provides a restriction to retard for a short interval the flow of combustion products out of the combustion chamber, and reacts with the caustic soda effluent resulting from the combustion process, to provide a tacky surface for trapping solid particulate products and for converting the caustic soda to form innocuous sodium silicate. The action of the filter is facilitated because of its location in the combustion chamber where it is operative to condense and trap solid particulate residue and to react with the caustic soda effluent during the short interval that the generated gases are still undergoing relatively low rates of acceleration and velocity. The invention further features a secondary filter that serves to cool the gas, provides a surface for further condensation of particles, and additionally, reacts with caustic soda particles to form sodium silicate. The secondary filter constitutes a final cooling filter for fine particle entrapment with low pressure drop.

It will be understood that where the alkali metal azide forming the gas generant composition is a metal other than sodium, and is for example, potassium or lithium, the reaction of the glass of the fiberglass or cloth of the primary filter and the reaction of the aluminum silicate blanket of the secondary filter with the metallic oxide effluent of the combustion process would, in each case, be to form an innocuous alkali metal silicate, that is, potassium silicate or lithium silicate.

What is claimed is:

1. A method of generating clean nitrogen gas in which most of the combustion residue product has been removed comprising
   a. providing a combustible composition essentially 60–80% sodium azide, 2–26% ferric oxide, 2–26% molybdenum disulfide and 0–6% sulfur,
   b. placing said combustible composition in a combustion chamber having gas discharge orifices,
   c. raising the temperature of said combustible composition sufficiently to ignite it, and
   d. providing filtering means and cooling means between said combustible composition and said gas discharge orifices, said filtering means being selected for its compatibility with the combustion process and for its characteristic property at the combustion temperature of said composition of becoming less porous for a short interval during an early stage of the combustion function time thereby, during such interval, to increase the restrictive effect thereof and to retard the flow of combustion products out of said gas discharge orifices to allow such combustion products to be cooled by and condensed on said cooling means.

2. A method as specified in claim 1 wherein said filtering means comprises at least one layer of a woven fabric, and said cooling means comprises a fine mesh screen provided between said fabric and said combustible composition.

3. A method as specified in claim 2, wherein said combustible composition is in pelletized form, the pellets being so placed in said combustion chamber as to be uniformly distributed therein, and wherein said woven fabric comprises a fiberglass woven fabric that reacts with a product of the combustion process, an alkali metal oxide, to form an innocuous alkali metal silicate.

4. A method as specified in claim 2 wherein said product of the combustion process is caustic soda and said fiberglass woven fabric reacts with said caustic soda to form innocuous sodium silicate, and further comprising providing a diffuser chamber in surrounding relation to said combustion chamber, said diffuser chamber having gas discharge orifices, and providing filtering means and cooling means in said diffuser chamber between the gas discharge orifice of said combustion chamber and diffuser chamber, said diffuser chamber filtering means including a blanket of aluminum silicate to react with caustic soda particulate residue to form innocuous sodium silicate.

5. A method of generating clean nitrogen gas in which most of the combustion residue product has been removed comprising;
   (a) providing a combustible composition essentially about 65 weight percent to about 70 weight percent alkali metal azide, up to about 4 weight percent sulfur and from about 27 weight percent to about 33 weight percent polybdenum disulfide;
   (b) placing said combustible composition in a combustion chamber having gas discharge orifices;
   (c) raising the temperature of said combustible composition sufficiently to ignite it; and
   (d) providing filtering means and cooling means between said combustible composition and said gas discharge orifices, said filtering means being selected for its compatibility with the combustion process and for its characteristic property at the combustion temperature of said composition of becoming less porous for a short interval during an early stage of the combustion function time thereby, during such interval, to increase the restrictive effect thereof and to retard the flow of combustion products out of said gas discharge orifices to allow such combustion products to be cooled by and condensed on said cooling means.

6. A method as specified in claim 5 wherein said filtering means comprises at least one layer of a woven fabric and said cooling means comprises a fine mesh screen provided between said fabric and said combustible composition.

7. A method as specified in claim 6 wherein said combustible composition is in pelletized form, the pellets being so placed in said combustion chamber as to be uniformly distributed therein, and wherein said woven fabric comprises a fiberglass woven fabric that reacts with a product of the combustion process, an alkali metal oxide, to form a innocuous alkali metal silicate.

8. A method as specified in claim 6 wherein said product of the combustion process is caustic soda and said fiberglass woven fabric reacts with said caustic soda to form innocuous sodium silicate, and further comprising providing a diffuser chamber in surrounding relation to said combustion chamber, said diffuser chamber having gas discharge orifices, and providing filtering means and cooling means in said diffuser chamber between the gas discharge orifice of said combustion chamber and diffuser chamber, said diffuser chamber filtering means including a blanket of aluminum silicate to react with caustic soda particulate residue to form innocuous sodium silicate.

9. A gas generator comprising:
housing means defining a combustion chamber having first gas discharge orifice means;
combustible gas generating means disposed in said combustion chamber, said generating means being operable upon ignition to produce gas and combustion products; and
primary filter means disposed in said combustion chamber adjacent said orifice means to cool said gas and to trap said combustion products, said filter means including a substance proximate to said gas generating means, in close surrounding relation thereto, said substance being selected for its compatibility with the combustion process and having a surface which at the temperature and environment of the combustion process, begins to melt and becomes tacky at an early stage of the combustion process whereby the porosity of said filter means is reduced for a short interval of the combustion process function time while the acceleration and velocity of the generated gas are at a relatively low level, thereby preventing combustion products from being blown out of the combustion chamber through said orifice means and allowing such products to condense and become entrapped in said filter means, wherein said substance of said primary filter means is a woven fabric the fibers of which swell as they become tacky to increase the restrictive effect of said filter means to the flow of combustion products therethrough, such increased flow restrictive effect existing for a short interval only during the combustion process function period to retard the flow out of said combustion chamber of combustion products to increase the period for cooling thereof and thereby condensation and trapping of molten solid products of combustion by said filter means to minimize the quantity of such solid products of combustion that are blown out of said combustion chamber through said orifice means, and
wherein said combustible gas generating means includes a plurality of pellets that are uniformly disposed in said combustion chamber and that are comprised of a compacted mixture of 66% sodium azide, 30% ferric oxide, 2% sulfur and 2% molybdenum disulfide.

10. A gas generator as specified in claim 9 wherein said substance of said primary filter means comprises a plurality of layers of a fiberglass woven fabric.

11. A gas generator as specified in claim 10 wherein said primary filter means includes a plurality of filter portions of which said fiberglass woven fabric comprises in interior portion, and wherein the portion of said primary filter means adjacent to said first gas discharge orifice means comprises at least one layer of a coarse screen and the portion of said filter means adjacent the gas generating means comprises a plurality of layers of fine mesh screen.

12. A gas generator as specified in claim 11 wherein said gas generating means and said primary filter means are contained in a rupturable hermetically sealed cartridge, and wherein said cartridge and said combustion chamber are both cylindrical in shape, said cartridge being concentrically arranged with respect to and substantially filling said combustion chamber.

13. A gas generator as specified in claim 12 wherein said housing means further includes wall means defining an annular space external of said combustion chamber, said wall means having second gas discharge orifices and further including secondary filter means in said annular space between said first and second orifice means further to cool said gas and trap combustion products, said secondary filter means including a plurality of filter portions of which an interior portion comprises aluminum silicate which reacts with caustic soda in the products of combustion to form sodium silicate.

14. A gas generator as specified in claim 13 wherein said gas generating means includes ignition means comprising a granular mixture of 15% by weight of boron and 85% of potassium nitrate plus or minus 10% for each component with the further addition of 3–10% of lead azide, said gas generating pellets surrounding said ignition means in contact therewith.

15. A gas generator as specified in claim 14 wherein said ignition means further includes an electric squib, a perforated tube and a rupturable metal foil sealed to the outer wall of said tube, said electric squib being disposed centrally in said tube with said granular mixture in surrounding relation and in contact therewith.

16. A gas generator comprising:
housing means defining a combustion chamber having first gas discharge orifice means;
combustible gas generating means disposed in said combustion chamber, said generating means being operable upon ignition to produce gas and combustion products; and
primary filter means disposed in said combustion chamber adjacent said orifice means to cool said gas and to trap said combustion products, said filter means including a substance proximate to said gas generating means, in close surrounding relation thereto, said substance being selected for its compatibility with the combustion process and having a surface which at the temperature and environment of the combustion process, begins to melt and becomes tacky at an early stage of the combustion process whereby the porosity of said filter means is reduced for a short interval of the combustion process function time while the acceleration and velocity of the generated gases are at a relatively low level, thereby preventing combustion products from being blown out of the combustion chamber through said orifice means and allowing such products to condense and become entrapped in said filter means, wherein said substance of said primary filter means comprises a plurality of layers of a fiberglass woven fabric, wherein said primary filter means includes a plurality of filter portions of which said fiberglass woven fabric layers comprise an interior portion, wherein the portion of said primary filter means adjacent to said gas discharge orifice means comprises at least one layer of a coarse screen and the portion of said primary filter means adjacent the gas generating means comprises a plurality of layers of fine mesh screen, wherein the composition of said gas generating means is such that one of the products of combustion is an alkali metal oxide, said fiberglass woven fabric reacting chemically with said alkali metal oxide to produce an alkali metal silicate and to cause the fibers of said fiberglass woven fabric to swell and to be effective, as the pressure in said combustion chamber rises to a predetermined level, to restrict the flow of gas through said filter means thereby allowing molten products of combustion to cool and condense on said fine mesh screen, wherein said one of the products of combustion is caustic soda and the product of the reaction of said caustic soda with said fiberglass woven fabric is sodium silicate, wherein said generating means and said primary filter means are contained in a hermetically sealed cartridge, wherein said cartridge and said combustion chamber are both cylindrical in shape, said cartridge being concentrically arranged with respect to and substantially completely filling said combustion chamber, and wherein said housing means further includes wall means defining an annular space external of said combustion chamber, said wall means having second gas discharge orifice means, and further including secondary filter means in said annular space between said first and second orifice means further to cool said gas and trap combustion products, wherein said secondary filter means includes a plurality of filter portions, an intermediate portion of said secondary filter means comprising a blanket of aluminum silicate which reacts chemically with caustic soda to form sodium silicate, wherein said secondary filter means includes a standoff screen and a coarse screen between said first gas discharge orifice means and said blanket of aluminum silicate, and a fine screen between said blanket of aluminum silicate and said second gas discharge orifice means, and wherein said combustible gas generating means includes ignition means, said ignition means being disposed along the common cylindrical axis of said cartridge and combustion chamber, and wherein said gas generating means includes a plurality of pellets that are uniformly distributed in said cartridge in surrounding relation to said ignition means and that are comprised of a compacted mixture of about 65 weight percent to about 70 weight percent alkali metal azide, up to about 4 weight percent sulfur and from about 27 weight percent to about 33 weight percent molybdenum disulfide.

17. A gas generator as specified in claim 16 wherein said pellets are comprised of a compacted mixture of about 68 weight percent sodium azide, about 2 weight percent sulfur and about 30 weight percent molybdenum disulfide.

18. A gas generator comprising:
housing means defining a combustion chamber having first gas discharge orifice means;
combustible gas generating means disposed in said combustion chamber, said generating means being operable upon ignition to produce gas and combustion products; and
primary filter means disposed in said combustion chamber adjacent said orifice means to cool said gas and to trap said combustion products, said filter means including a substance proximate to said gas generating means, in close surrounding relation thereto, said substance being selected for its compatibility with the combustion process and having a surface which at the temperature and environment of the combustion process, begins to melt and becomes tacky at an early stage of the combustion process whereby the porosity of said filter means is reduced for a short interval of the combustion process function time while the acceleration and velocity of the generated gases are at a relatively low level, thereby preventing combustion products from being blown out of the combustion chamber through said orifice means and allowing such products to condense and become entrapped in said filter means, wherein said substance of said primary filter means is a woven fabric the fibers of which swell as they become tacky to increase the restrictive effect of said filter means to the flow of combustion products therethrough, such increased flow restrictive effect existing for a short interval only during the combustion process function period to retard the flow out of said combustion chamber of combustion products to increase the period for cooling thereof and thereby condensation and trapping of molten solid products of combustion by said filter means to minimize the quantity of such solid products of combustion that are blown out of said combustion chamber through said orifice means, and wherein said combustible gas generating means includes a plurality of pellets that are uniformly disposed in said combustion chamber and that are comprised of a compacted mixture of about 65 weight percent to about 70 weight percent alkali metal azide, up to about 4 weight percent sulfur, and from about 27 weight percent to about 33 weight percent molybdenum disulfide.

19. A gas generator as specified in claim 18 wherein said pellets are comprised of a compacted mixture of about 68 weight percent sodium azide, about 2 weight percent sulfur and about 30 weight percent molybdenum disulfide.

20. A gas generator as specified in claim 18 wherein said substance of said primary filter means comprises a plurality of layers of a fiberglass woven fabric.

21. A gas generator as specified in claim 20 wherein said primary filter means includes a plurality of filter portions of which said fiberglass woven fabric comprises an interior portion and wherein the portion of said primary filter means adjacent to said first gas discharge orifice means comprises at least one layer of a coarse screen and the portion of said filter means adjacent the gas generating means comprises a plurality of layers of fine mesh screen.

22. A gas generator as specified in claim 21 wherein said gas generating means and said primary filter means are contained in rupturable hermetically sealed cartridge, and wherein said cartridge and said combustion chamber are both cylindrical in shape, said cartridge being concentrically arranged with respect to and substantially filling said combustion chamber.

23. A gas generator means as specified in claim 22 wherein said housing means further includes wall means defining an annular space external of said combustion chamber, said wall means having filter means in said annular space between said first and second orifice means further to cool said gas and trap combustion products, said second filter means including a plurality of filter portions of which an interior portion comprises aluminum silicate which reacts with caustic soda in the combustion products to form sodium silicate.

24. A gas generator as specified in claim 23 wherein said gas generating means includes ignition means comprising a granular mixture of 15% by weight of boron and 85% of potassium nitrate plus or minus 10% for each component with the further addition of 3 to 10% lead azide said gas generating pellets surrounding said ignition means in contact therewith.

25. A gas generator as defined in claim 24 wherein said ignition means further includes an electric squib, a perforated tube and a rupturable metal foil sealed to the outer wall of said tube, said electric squib being centrally of said tube with said granular mixture in surrounding relation and in contact therewith.

26. A gas generator comprising:
housing means defining a combustion chamber having first gas discharge orifice means;
combustible gas generating means disposed in said combustion chamber, said generating means being operable upon ignition to produce gas and combustion products; and
primary filter means disposed in said combustion chamber adjacent said orifice means to cool said gas and to trap said combustion products, said filter means including a substance proximate to said gas generating means, in close surrounding relation thereto, said substance being selected for its compatibility with the combustion process and having a surface which at the temperature and environment of the combustion process, begins to melt and becomes tacky at an early stage of the combustion process whereby the porosity of said filter means is reduced for a short interval of the combustion process function time while the acceleration and velocity of the generated gases are at a relatively low level, thereby preventing combustion products from being blown out of the combustion chamber through said orifice means and allowing such products to condense and become entrapped in said filter means, wherein said substance of said primary filter means comprises a plurality of layers of a fiberglass woven fabric, wherein said primary filter means includes a plurality of filter portions of which said fiberglass woven fabric layers comprise an interior portion, wherein the portion of said primary filter means adjacent to said gas discharge orifice means comprises at least one layer of a coarse screen and the portion of said primary filter means adjacent the gas generating means comprises a plurality of layers of fine mesh screen, wherein the composition of said gas generating means is such that one of the products of combustion is an alkali metal oxide, said fiberglass woven fabric reacting chemically with said alkali metal oxide to produce an alkali metal silicate and to cause the fibers of said fiberglass woven fabric to swell and to be effective, as the pressure in said combustion chamber rises to a predetermined level, to restrict the flow of gas through said filter means thereby allowing molten products of combustion to cool and condense on said fine mesh screen, wherein said one of the products of combustion is caustic soda and the product of the reaction of said caustic soda with said fiberglass woven fabric is sodium silicate, wherein said generating means and said primary filter means are contained in a hermetically sealed cartridge, wherein said cartridge and said combustion chamber are both cylindrical in shape, said cartridge being concentrically arranged with respect to and substantially completely filling said combustion chamber, and wherein said housing means further includes wall means defining an annular space external of said combustion chamber, said wall means having second gas discharge orifice means, and further including secondary filter means in said annular space between said first and second orifice means further to cool said gas and trap combustion products, wherein said secondary filter means includes a plurality of filter portions, an intermediate portion of said secondary filter means comprising a blanket of aluminum silicate which reacts chemically with caustic soda to form sodium silicate, wherein said secondary filter means includes a standoff screen and a coarse screen between said first gas discharge orifice means and said blanket of aluminum silicate, and a fine screen between said blanket of aluminum silicate and said second gas discharge orifice means, and wherein said combustible gas generating means includes ignition means, said ignition means being disposed along the common cylindrical axis of said cartridge and combustion chamber, and wherein said gas generating means includes a plurality of pellets that are uniformly distributed in said cartridge in surrounding relation to said ignition means and that are comprised of a compacted mixture of 66% sodium azide, 30% ferric oxide, 2% sulfur and 2% molybdenum disulfide.

* * * * *